United States Patent
Srivastava et al.

(10) Patent No.: US 12,231,419 B2
(45) Date of Patent: Feb. 18, 2025

(54) METHODS AND SYSTEMS FOR IMPLEMENTING UNIQUE SESSION NUMBER SHARING TO ENSURE TRACEABILITY

(71) Applicant: T-Mobile USA, Inc., Bellevue, WA (US)

(72) Inventors: Nilay Srivastava, Sammamish, WA (US); Michael Engan, Bellevue, WA (US); Jiawen Tu, Kent, WA (US); James Alexander Latham, Redmond, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 344 days.

(21) Appl. No.: 17/710,661

(22) Filed: Mar. 31, 2022

(65) Prior Publication Data

US 2023/0319025 A1    Oct. 5, 2023

(51) Int. Cl.
*H04L 9/40* (2022.01)
*H04L 67/146* (2022.01)

(52) U.S. Cl.
CPC ...... *H04L 63/0807* (2013.01); *H04L 63/0876* (2013.01); *H04L 63/102* (2013.01); *H04L 63/1408* (2013.01); *H04L 63/1441* (2013.01); *H04L 67/146* (2013.01)

(58) Field of Classification Search
CPC ............. H04L 63/0807; H04L 63/0876; H04L 63/102; H04L 63/1408; H04L 63/1441; H04L 67/146
See application file for complete search history.

(56) References Cited

U.S. PATENT DOCUMENTS

| | | | |
|---|---|---|---|
| 2004/0098609 A1* | 5/2004 | Bracewell | H04L 63/068 726/6 |
| 2017/0161749 A1* | 6/2017 | Shaikh | G06Q 20/382 |
| 2019/0327310 A1* | 10/2019 | Parthasarathy | H04L 67/145 |
| 2020/0250664 A1* | 8/2020 | Kumar | H04L 63/0838 |

* cited by examiner

*Primary Examiner* — Khoi V Le
(74) *Attorney, Agent, or Firm* — Lee & Hayes, P.C.

(57) ABSTRACT

Methods and systems for unique session number sharing to ensure traceability are discussed herein. According to an implementation, a user sends a request to login a browser from a user equipment to a server device. The server device validates a user credential associated with the browser by comparing the user credential with pre-stored user registration information. Once the user credential is validated, the server device generates a session with a unique session number (USN) with respect to the request. The server device generates a plurality of logs with respect to the activities occurred during the session and associates the USN with each of the multiple logs. The USN is further included in an access token that authorizes the user to access the websites hosted by the browser.

20 Claims, 8 Drawing Sheets

METHODS AND SYSTEMS FOR IMPLEMENTING UNIQUE SESSION NUMBER SHARING TO ENSURE TRACEABILITY

BACKGROUND

E-commerce allows individuals and companies to buy and sell goods and services over the Internet. Nearly every imaginable product and service is available through e-commerce transactions, including books, music, plane tickets, and financial services such as stock investing and online banking. Consumers may manage their accounts registered with a variety of websites and/or mobile apps through Internet. Quite often, the consumers log in on a browser or mobile app using an authentication entry and later navigate to one or more websites or app pages from the authentication entry app.

As services are hosted online, the websites and mobile apps a target for bad actors. As a user may have the same passwords on multiple websites, the bad actors may find a user's password when one of these passwords is hacked. In some circumstances, the bad actors may perform phishing attacks by sending fake links that look like logins to the users or by calling the users, pretending to be a security team representative.

To better protect user authentication information, online websites keep the authentication service separate from the website or the entry app. For example, the website of T-Mobile, MyTMO site hosts a collection of websites and/or apps for different services. MyTMO site uses the authentication scheme OAuth2 that keeps the authentication of the hosted websites and/or apps separate from the MyTMO billing site. A single-sign-on scheme can be used to reach more websites after a MyTMO login for websites supporting user support, upgrades, calling, carrier banking, etc. However, the multiple websites and/or apps may have their own identifiers for a same user, e.g., email, mobile station integrated services digital network ID (MSISDN), or a unique ID. There is no assumption of consistencies among those user identifiers. In fact, in some cases identities are deliberately kept separated.

Finding all user activities across multiple websites and/or apps, therefore, is often a challenge. Particularly in the context of security, quickly finding all activity of a login to an account by a bad actor is critical. The separation of the authentication service from other websites adds an additional challenge. For security, the temporary authorization code that links the user's authentication with the website and subsequent user activity is deliberately opaque. When access from a bad actor is identified, multiple requests on multiple system logs using joined identifiers may be needed.

A unique session number (USN) supports the requirement for traceability from authentication of the user to the end of the user's session. The USN should be shared with all servers while the user browses within the authenticated session context on supported websites. The USN may be shared with the browser via an HTTP cookie, or app, but the solution always prefers the USN from protected servers and does not exclusively rely on the security of the USN passed to user-space where it may be manipulated or stolen by a bad actor.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
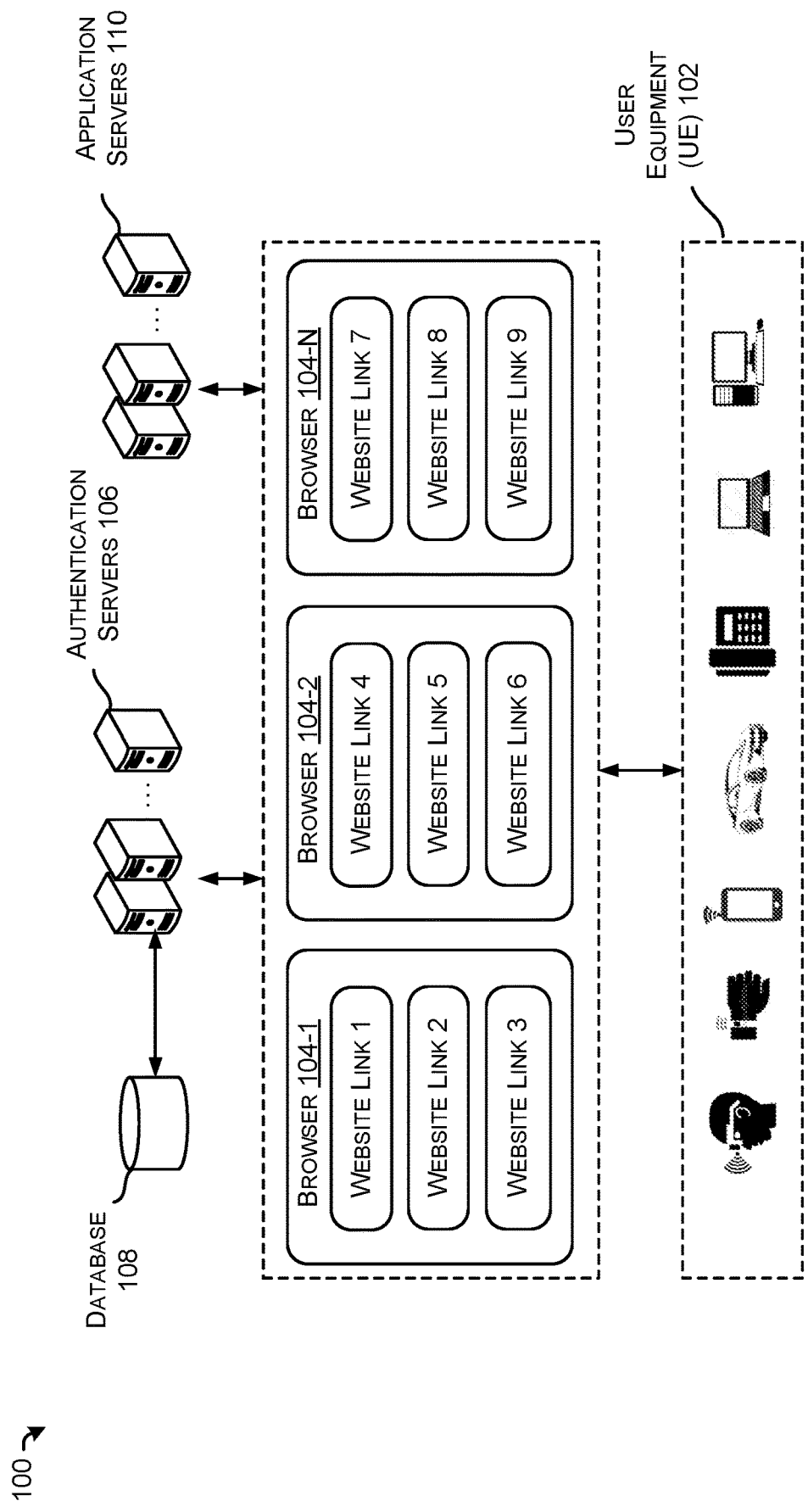
FIG. 1 illustrates an example network scenario, in which unique session number (USN) sharing is implemented to ensure traceability.

Techniques for unique session number sharing to ensure traceability are discussed herein. In some implementations, a method for implementing unique session number sharing to ensure traceability may be implemented on a server device. The server device may include an authentication server that is configured to validate the user credentials associated with certain browsers, websites, and/or apps. The server device may receive, from a user equipment (UE), a request to log in a browser. The server device further authenticates a user credential associated with the browser. Once the user credential is authenticated, the server device generates a session with a unique session number (USN) with respect to the request. There may be a universally unique identifier (UUID) but must be unique with respect to the maximum session length. The server device further generates a log record corresponding to the request, the log record including the USN, and stores the log record stored in a file or database.

In some implementations, the unique session number is associated with all log records generated during the corresponding session. In addition to the USN, the log records may also include a time stamp associated with the request, the identity of the user record, an IP address associated with the request, information associated with the browser, device information associated with the UE, or any combination thereof.

In some implementations, the method may further comprise receiving, from the UE, at least one subsequent request to log in at least one website through the browser; authorizing the user to access the corresponding website by transmitting an authorization code to the UE; receiving, from the UE, a second request to exchange the authorization code for a token to access the corresponding website; generating an access token and/or OpenID JSON web token including the USN; and transmitting the token to the UE.

In some implementations, the method may further comprise generating at least one subsequent log record corresponding to the at least one subsequent request, the at least one subsequent log record including the USN; and storing the at least one subsequent log record in the database.

In some implementations, the token including the USN is encrypted using a key pair including a public key and a private key.

In some implementations, the at least one second log record further includes at least one time stamp associated with the at least one subsequent request, at least one IP address associated with the at least one subsequent request, information associated with the at least one web site, device information associated with the UE, or any combination thereof.

In some implementations, the method may further comprise receiving an inquiry related to user account security; obtaining a list of log records stored in the database, the list of log records being associated with a same USN; tracing browsing activities base on respective time stamps of the log records; and determining suspicious browsing activities based on information associated with the log records.

In some implementations, the techniques discussed herein may be implemented in a computer network using one or more of protocols including but are not limited to Ethernet, 3G, 4G, 4G LTE, 5G, or any combination thereof. In some examples, the network implementations may support standalone architectures, non-standalone architectures, dual connectivity, carrier aggregation, etc. Example implementations are provided below with reference to the following figures.

FIG. 1 illustrates an example network scenario, in which unique session number (USN) sharing is implemented to ensure traceability.

Online user activities are usually associated with a variety of websites and/or mobile apps implemented by one or more user devices. A user may log in multiple computing devices at a same location or various locations simultaneously or at different time. Requests for authentication of the user credentials and/or authorizations for user activities are initiated from the multiple computing devices. According to the network scenario 100 as illustrated in FIG. 1, the user device, also referred to as user equipment (UE) 102, may be any device that can connect to Internet through a wired, wireless, or satellite connection. In some examples, UE 102 may be a mobile device, such as a cellular phone or a smart phone. In other examples, UE 102 may be an IP phone. In other examples, UE 102 may be a personal computer (PC) such as a laptop, desktop, or workstation, a personal digital assistant (PDA), a media player, a tablet computer, a gaming device, or any other type of computing or communication device. In yet other examples, UE 102 may include the computing devices implemented on the vehicle including but are not limited to, an autonomous vehicle, a self-driving vehicle, or a traditional vehicle capable of connecting to internet. In yet other examples, UE 102 may be a wearable device and/or wearable materials, such as a smart watch, smart glasses, clothes made of smart fabric, etc. It should be appreciated that the examples of UE 102 discussed herein are merely for illustrative purposes. The present disclosure is not intended to be limiting. Any objects that are configured with communication capabilities to connect to Internet can be used as the user equipment.

The user may access various websites through the browsers (104-1, 104-2, . . . , 104-N, referred to as browsers 104 herein after) implemented on UE 102. Browsers 104 may include but are not limited to, Internet Explorer, Microsoft Edge, Chrome, Firefox, Opera, Safari, Pale Moon, SeaMonkey, Vivaldi, Yandex, etc. Depending on the types of UEs, the various types of browsers 104 may be available in different instances and/or versions that are developed to be suitable for different types of UEs. For example, Chrome has PC instances as well as app instances for iPhone and Android mobile phones. As another example, Safari, as initially developed for Apple MAC platform, now has instances for platforms running a Windows operation system. Some of browsers 102 may be configured to be a cross-platform web browsers.

An attempt to access a browser (e.g., browser 104-1) from UE 102 generates a request to application servers 110 that host the browser content. In some implementations, an attempt to access a website (e.g., website link 1) hosted by browser 104-1 may generate a request to application servers 110 that host the content of the website. In yet other implementations, an attempt to launch an app from a mobile phone may trigger a request to authenticate the user's credential through a browser account before launching the app with proper content.

In response, application servers 110 return the content of a webpage to be displayed on the browser. Application servers 110 may pull the content from various content portals, compile the pulled content with the content pushed from other resources, and generate a webpage to be displayed on browser 104-1. The content compiling may be performed by application servers 110 in real-time, periodically, and/or in an offline basis. In some examples, the webpage displayed on the browser includes a login window, requesting the user to provide the credentials for the corresponding browser. The user's credentials inputted through browser 104 are sent to authentication servers 106 via a network. Authentication servers 106 may verify the user credentials according to the user credentials previously stored in a database 108. Once the user credentials are verified, authentication servers 106 creates a session for a series of subsequent browsing activities generated from browser 104. The session is released upon receiving a logoff request from browser 104.

Authentication server 106 may be a general computing server, a dedicated computing server, or a computing server group. Authentication servers 106 may be located locally, and/or remotely on a cloud. Authentication servers 106 may further include a front-end user interface (UI) and back-end servers. The front-end UI is configured to bridge the communications between the user equipment and the back-end servers. Database 108 may be configured to store information associated with the users including but is not limited to, user profile, user registration information on various browsers and/or websites, user credentials on various browsers and/or websites, user activity logs, etc. Database 108 may be a local storage residing on a same location of authentication servers 106, or a cloud storage accessible to authentication servers 106 through the Internet.

In general, browser 104 hosts a plurality of website links that can redirect the user to other web resources. As illustrated in FIG. 1, browser 104-1 hosts website links 1, 2 and 3, browser 104-2 hosts website links 4, 5 and 6, and browser 104-3 hosts website links 7, 8 and 9. The user may use multiple login information for different websites hosted by a same browser. For example, the user may use an email address as the login username for website link 1 hosted by browser 104-1 and use the mobile phone number as the login username for website link 3 hosted by browser 104-1. Browser 104-1 may use an authentication scheme to separately authenticate the users to access different websites. OAuth 2.0 is an example of single-sign-on protocol that uses the authentication of user's credential on one website to access and use information related to the user's account on another website. OpenID is another example that uses a single set of user credentials to access multiple sites. It should be appreciated that the authentication schemes discussed herein are merely for illustrative purposes. Any authentication schemes that separate the authentication for the users to access different websites and/or cross platforms may be implemented.

As discussed herein, a successful login to browser 104-1 generates a session for subsequent browsing activities on one or more websites hosted by browser 104-1. Even though the single-sign-on is implemented for user authentication after the login, inconsistent user identifiers on multiple websites redirected from browser 104-1 makes it challenging to trace the user activities within the session. To tackle this challenge, authentication servers 106 utilizes the session number for a corresponding session to log the activities generated within the session. In implementations, the session number may be included in each log record for activities generated within the session. The activities generated within the session may include user activities such as, requesting for authentication and/or authorization, requesting to access a website, requesting to logoff from a website, etc. In some examples, the activities generated within the session may also include activities related to authentication servers 106 and/or application servers 110 such as, validating the user credentials, creating session and session number, creating authorization code, creating access token, etc.

The log records are further stored in database 108. When a security team, or an operations team, of a service provider receives an alert related to a user account, the security team may retrieve the log records associated with the user account on various browsers and/or websites. As a session number is included in all log records of the user activities generated within a corresponding session, the security team can trace the user activities across all websites.

It should be appreciated that although browsers, websites, and/or weblinks are used herein for illustrative purposes, the browsers, websites, and/or weblinks can also be referred to as apps and/or app links implemented on smart phones, tablets, vehicle implemented computing device, etc. The log records can log various types of information associated with the activities within a session including but is not limited to, user login and/or request timestamps, IP address of the visited browser, IP address of the visited website, type of the browser and/or app that the user used, type of the device (i.e., UE 102) that the user used, etc.

Figure 2:
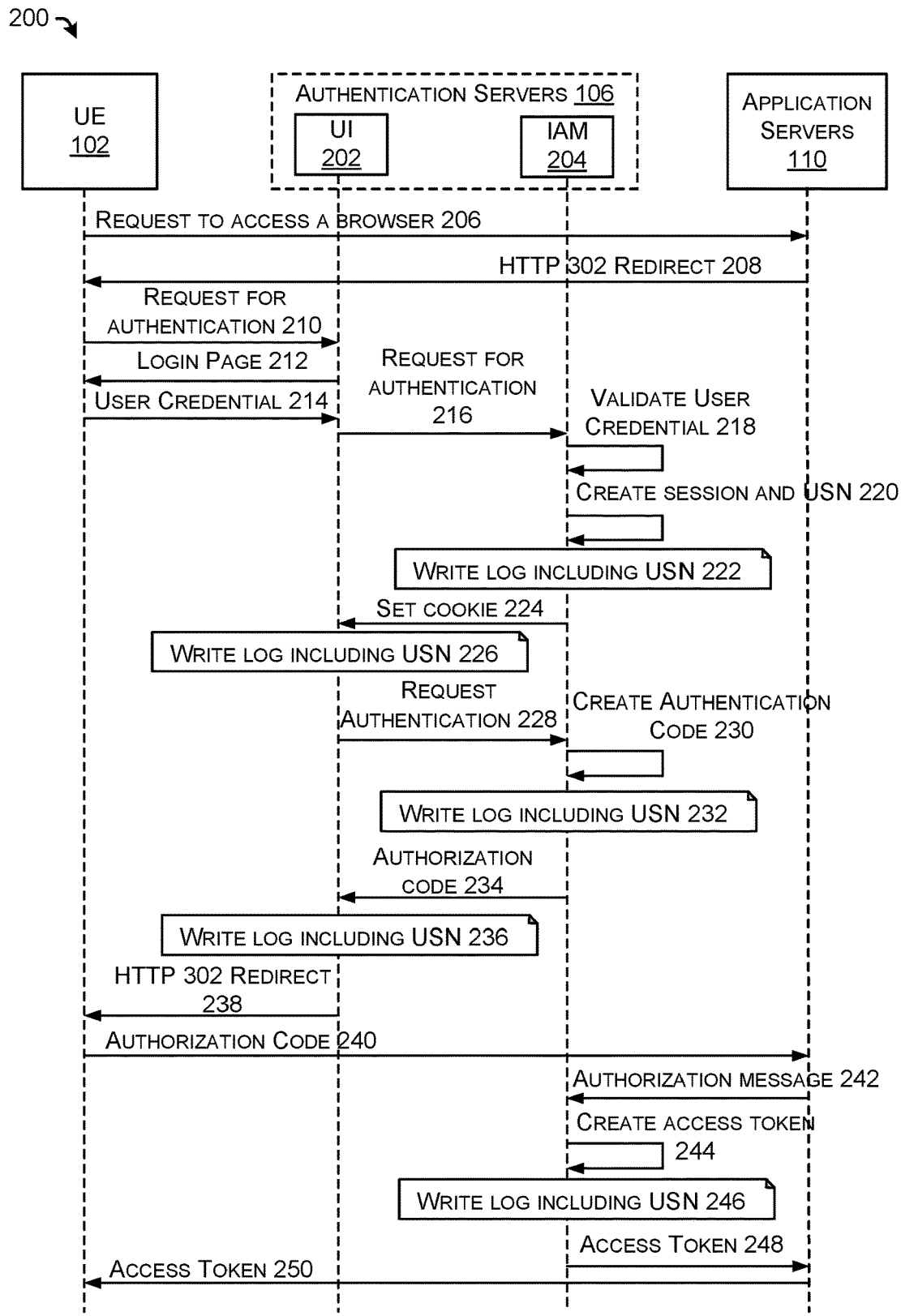
FIG. 2 illustrates an example USN sharing scenario according to an embodiment of the present disclosure.

FIG. 2 illustrates an example USN sharing scenario according to an embodiment of the present disclosure. According to the scenario 200 as illustrated in FIG. 2, authentication servers 106 includes a user interface (UI) 202 and an identify and access management (TAM) 204. TAM 204 may be configured as a back-end authentication server. UI 202 may act as an interface of an authentication server (e.g., authentication servers 106) to receive requests for authentication from UE 102, forward the requests for authentication to TAM 204, and forward messages from TAM 204 to UE 102.

UE 102 may generate a request to access a browser (at step 206), the content of which is hosted at application servers 110. Application servers 110 returns an HTTP 302 redirect (at step 208) to send the content of a webpage to UE 102. From the webpage, the user may send a request for authentication (at step 210) to authentication servers 106 in order to use the browser as an authenticated user. In response, authentication servers 106 returns a login page (at step 212) through UI 202 to UE 102. At the login page, the user may provide the user credential (at step 214) to authentication servers 106. UI 202 receives the user credential associated with the requested browser and generates a request for authentication (at step 216) to the back-end server (e.g., TAM 204).

TAM 204 validates the user credential (at step 218). The validation may be performed by comparing the received user credential with a pre-stored user credential in a database (e.g., database 108 as shown in FIG. 1). Once the user credential is validated, authentication servers 106 may create a session and a unique session number (USN) (at step 220). In some examples, the session is associated with a user login to a browser implemented by a user device (e.g., UE 102 as shown in FIG. 1). When the user requests to log off the browser from the user device, the session is deemed to be terminated. The USN may be represented using 16 bits integers, 32 bits integers, any binary number representations, or the combination of numbers and characters, etc. In implementations, the USN must be large enough to be unique over more than the lifetime of a session so it cannot match another other user's session.

The USN is stored in a database in the server with the rest of the session information. The database may be separate from a log file or a log database. As the USN is generated and maintained at the server device rather than the browser side at the user equipment, the USN cannot be tampered with by the user equipment.

In some examples, the user activities associated with the same account may be synchronized on multiple browsers implemented by multiple user devices. For example, the keywords being searched by the user on PC Chrome may be synchronized to the search field of iPhone Chrome. However, each login on individual user device constitutes an individual session and is assigned a unique session number by authentication server 106. This enables logged information for the same user on multiple devices to be disassociated, further enhancing clarity of the logs.

Once the session and the USN is created, IAM 204 writes a log including USN (at step 222) and store the log in the database or a file. The log is generated to log information related to the user login activity. In addition to USN, the log may further include the time that the user logs in the browser, user identifiers, the type of the browser used for login, the type of user equipment used for login, the IP address of the browser, etc. IAM 204 further sets cookie associated with the session (at step 224) and forward the cookie to UI 202. In some implementations, UI 202 may separately write a log including USN (at step 226) and store the log in the database. The log written by UI 202 may further include information related to the cookie associated with the session.

As discussed herein, when the user wants to access another web site through the browser, a request for authorization is generated from UE 102 and forwarded to authentication servers 106 (at step 228). IAM 204 generates an authorization code (at step 230) in response to the request, and writes a log including USN (at step 232). In addition to the browser information associated with the login, the information being logged (at step 232) may further include the website address that the user wants to access. The authorization code is returned from IAM 204 to UI 202 (at step 234) and may include the USN. Upon receiving the authorization code, UI 202 may separately write a log including the USN (at step 236). The information being logged (at step 236) may also include information associated with the authorization code.

UI 202 further forwards the authorization code to UE 102 through an HTTP 302 redirect message (at step 238) that may include the USN. As an access token is needed from application servers 110 to access the website, UE 102 sends the authorization code to application servers 110 to exchange the authorization code for an access token (at step 240) that may include the USN. In response, application servers 110 may send an authorization message to authentication servers 106 (at step 242). The application server 110 may log the request including the code and USN. Upon receiving the authorization message from application servers 110, IAM 204 creates an access token (at step 244) and writes a log including the USN (at step 246). Authentication servers 106 includes the USN of the session in the access token. In implementations, the JSON web token including the USN is signed and/or encrypted using a key pair including a public key and a private key and cannot be tampered with. The signing and encrypting of the USN may comply with the JSON web token (JWT) standards. Authentication servers 106 further returns the access token to the application server 110 (at step 248) which may pass the access token to the UE 102 (at step 250).

As discussed herein, UI 202 and IAM 204 of authentication servers 106 write multiple logs at different stages within a session. The information being logged may include different time stamps, user identifiers, different websites the user wants to access, IP addresses of these websites, type of user equipment, etc. Each of the multiple logs also includes the USN created for the session, thus, facilitating further user activities tracing. It should be appreciated that the elements of authentication servers 106 (i.e., UI 202 and IAM 204) are merely for illustrative purposes. The present disclosure is not intended to be limiting. In some implementations, functions of UI 202 and IAM 204 may be integrated to one entity. Consequently, the information separately logged by UI 202 and IAM 204 may be integrated into one single log. The logs generated by authentication servers 106 may be stored in a local storage communicatively connected to authentication servers 106. Alternatively, or additionally, the logs may be stored in a remote storage such as a cloud storage.

Figure 3:
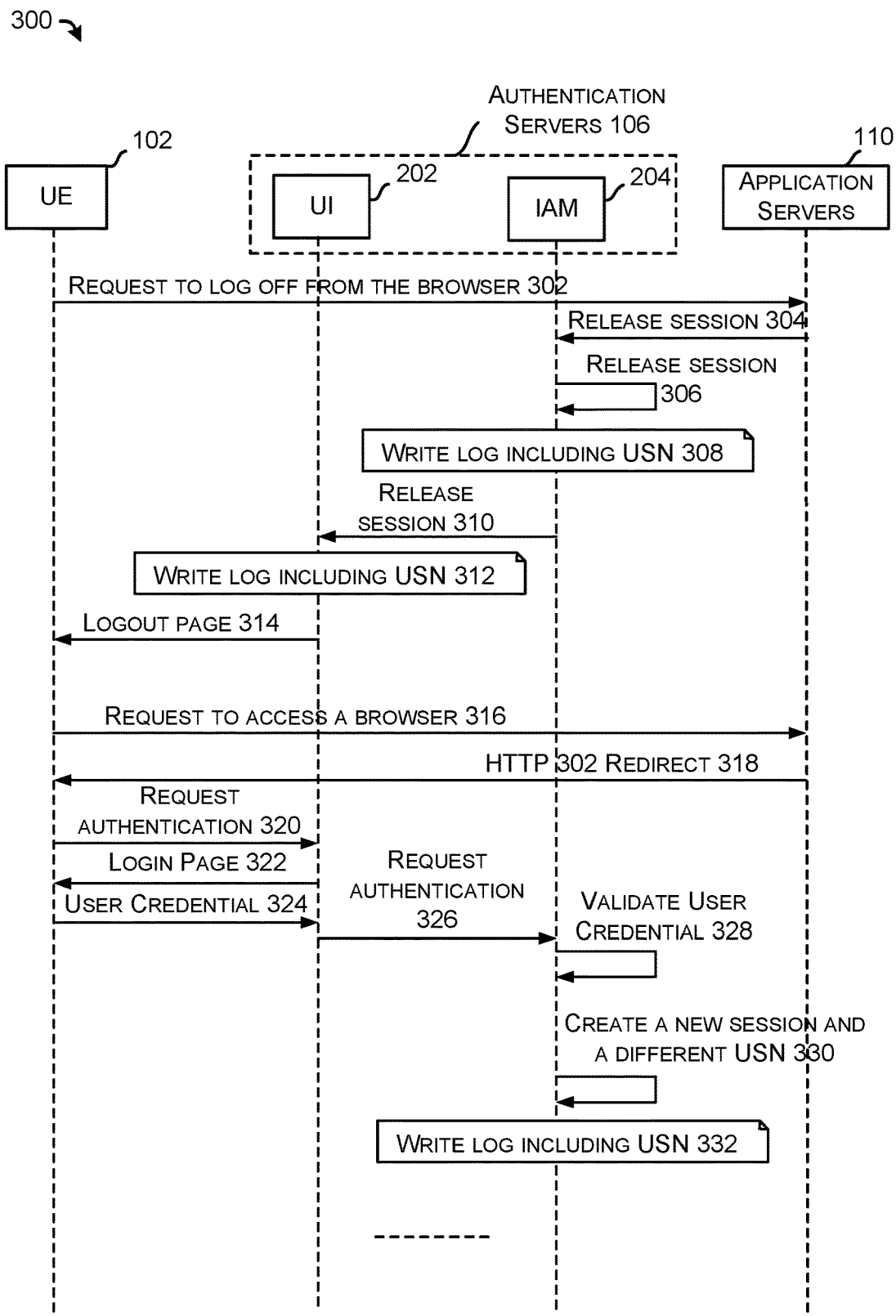
FIG. 3 illustrates another example USN sharing scenario according to an embodiment of the present disclosure.

FIG. 3 illustrates another example USN sharing scenario according to an embodiment of the present disclosure. The scenario illustrated in FIG. 3 may be a continuation of an active browsing session, for example, the browsing session as illustrated in FIG. 2.

According to the scenario 300 as illustrated in FIG. 3, during an active browsing session, UE 102 may forward a request to log off from the browser to application servers 110 (at step 302). Upon receiving the request, application servers 110 returns an instruction to release the session to authentication servers 106 (at step 304). IAM 204 of authentication servers 106 generates a message to release the session (at step 306) and writes a log including USN (at step 308). IAM 204 logs the time when the instruction to release the session is received, the browser information such as browser type and IP address, UE type, etc. IAM 204 also logs the USN associated with the active session (e.g., USN as illustrated in FIG. 2). The message to release the session is forwarded from IAM 204 to UI 202 (at step 310). Upon receiving the message, UI 202 writes a log including USN (at step 312) and sends a logout page to UE 102 (at step 314). The session previously created in FIG. 2 is thus released per request.

In some implementations, the user may resume login on a browser at a later time. The browser may be the same browser that the user logged off from. Alternatively, the browser may be a different browser installed on UE 102 or a different UE 102. For example, the user logged off from Safari at an earlier time and attempts to log in Chrome at a later time. UE 102 may send a request to access the browser to application servers 110 (at step 316). Similar to the communications as illustrated in FIG. 2, application servers 110 returns an HTTP 302 redirect (at step 318). The user may send a request for authentication (at step 320) from the homepage to authentication servers 106 to use the browser. In response, authentication servers 106 returns a login page (at step 322) through UI 202 to UE 102. The user provides the user credential (at step 324) to authentication servers 106. Upon receiving the user credential, UI 202 generates a request for authentication (at step 326) to the IAM 204. IAM 204 validates the user credential (at step 328) and creates a new session and a new USN (at step 330). IAM 204 further writes a log with respect to the new login (at step 332). The information being logged includes the new USN associated with the new session.

As discussed herein, the user may log in the same browser on the same UE. However, as the logoff from a browser constitutes a termination of a session, the USN created for the terminated session is only associated with the activities occurred during the terminated session. Even the user logs in the same browser on the same UE, authentication servers 106 creates a new session and a new USN for the new login activity. In some examples, the user may log in a different browser on the same UE, yet authentication servers 106 creates a new session and a new USN for the new login activity. The logs generated during the new session will indicate that the user uses a different browser.

In implementations, the user may log in a browser from a different UE. For example, the user logged off from Safari of a MAC computer and logs in Safari of an iPhone at a later time. Authentication servers 106 creates a new session and a new USN with respect to the activity occurred associated with the Safari of the iPhone. In some examples, the user remains logged in to Safari of the MAC computer but logs in Safari or Chrome from iPhone at the same time, authentication servers 106 yet creates different sessions and different USNs with respect to the activity respectively occurred on the browser on the MAC computer and the browser of the iPhone. In yet another example, the user remains logged in to Safari of a Surface laptop but logs in Chrome on the same Surface laptop, authentication servers 106 yet creates different sessions and different USNs with respect to the activity respectively occurred on the Safari and the Chrome on the Surface laptop.

According to the present disclosure, authentication servers 106 associates different USNs to log user activities within the corresponding sessions. When a bad actor gains access to a user account, the security department can trace the user browsing activities using the USN associated with the sessions and determine the detail information related to the session. For example, discovering an IP address of the UE may provide an approximate location of the bad actor's entry point. In another example, learning the type of UE may create additional security alerts to the user with respect to the data stored on that UE.

As discussed herein, the elements related to the authentication/authorization process shown in FIG. 3 are merely for illustrative purposes. The present disclosure is not intended to be limiting. A new login request may be generated from a type of UE different from UE 102. The new login request may be associated with a same and/or different browser implemented by the UE.

Figure 4:
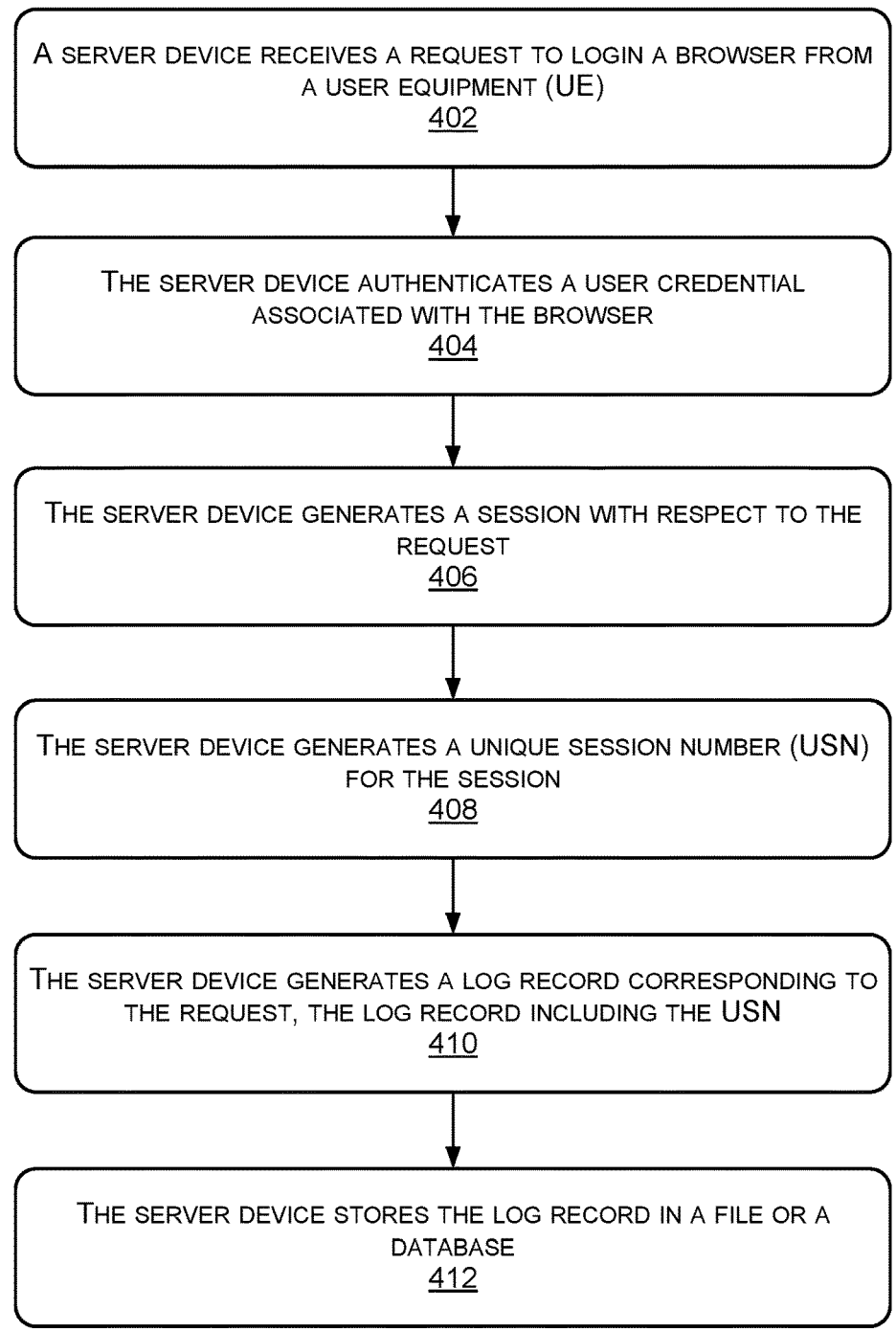
FIG. 4 illustrates an example process, in which unique session number (USN) sharing is implemented according to an embodiment of the present disclosure.

FIG. 4 illustrates an example process, in which unique session number (USN) sharing is implemented according to an embodiment of the present disclosure. The example process 400 may be performed by the authentication servers 106, as illustrated in FIGS. 1-3.

At operation 402, a server device receives a request to log in a browser from a user equipment (UE). In implementations, a launch of a browser from the UE may initiate a login request. In some other implementations, a launch of an app from a mobile device may initiate a login request.

At operation 404, the server device authenticates a user credential associated with the browser. When the user register with the bowser, a copy of the user credentials is saved at a storage accessible to the server device.

At operation 406, the server device generates a session with respect to the request. As discussed herein, the session refers to a browsing session associated with the UE. All user activities on various websites and/or apps navigated from the browser after the login and before a logoff are deemed as within the session. Accordingly, the session may include various information including but is not limited to, the browser information, the UE information, the user activities on different websites and/or apps, data and/or messages exchanged between the UE and the application servers, etc.

At operation 408, the server device generates a unique session number (USN) for the session. The USN may be represented using various formats such as binary number representations (e.g., 16 bits integers, 32 bits integers, etc.), combination of numbers and characters, etc. The USN is unique for each session triggered by a user login activity. The USN is stored in the server database with session information. In implementations, the server database where the USN is stored is separate from the log database or the log file where the logs are stored. In circumstances, the written log is not expected to be read again from the log database or the log file, however, the authentication server will need to find the USN from the server database for later transactions. In implementations, the USN is included in all logs generated during the session.

At operation 410, the server device generates a log record corresponding to the request, the log record including the USN. As discussed herein, the server device may generate multiple logs to record activities occurred during the session. The log record corresponding to the login request is the first log associated with the session. During the session, the user may access some websites and/or use some apps. The server device may log information related to those activities and associate the USN with each of the log records in the session. The log information may include the HTTP links of these websites, the names of these apps, activities the user performed on these websites and/or these apps (e.g., browsing, purchasing, chatting, etc.), etc.

At operation 412, the server device stores the log record in a file or database. The server device stores the log records associated with the activities in the session. All the log records of the session are assigned with a same USN created for the session.

Figure 5:
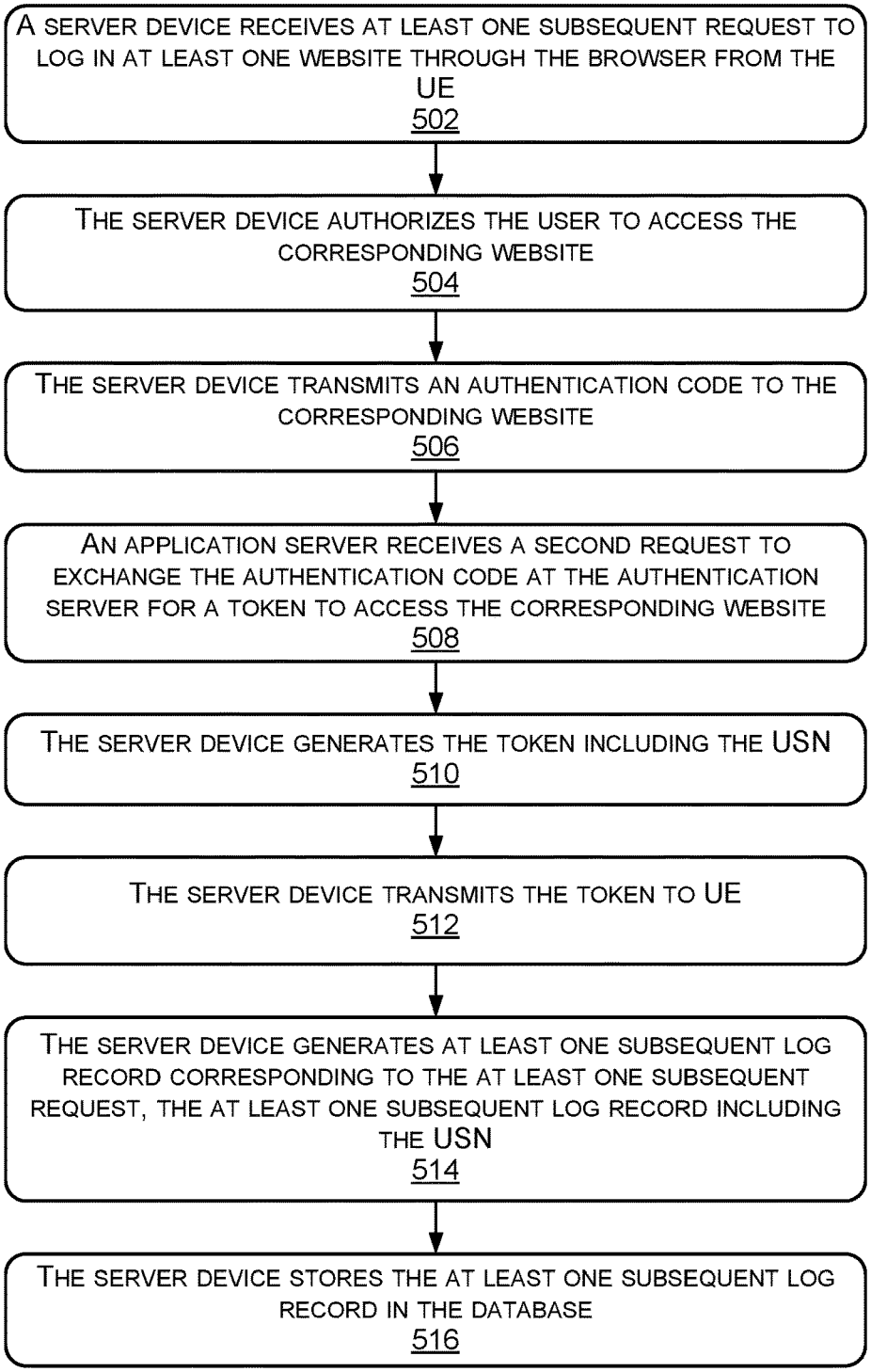
FIG. 5 illustrates another example process, in which unique session number (USN) sharing is implemented according to an embodiment of the present disclosure.

FIG. 5 illustrates another example process, in which unique session number (USN) sharing is implemented according to an embodiment of the present disclosure. The example process 500 may be performed by the authentication servers 106, as illustrated in FIGS. 1-3. The example process 500 may be a continuation of the example process 400, as illustrated in FIG. 4.

At operation 502, the server device receives at least one subsequent request to access at least one website through the browser from the UE. In implementations, the subsequent request is triggered when the user access a website via the browser supported by the same authentication service and single-sign on.

At operation 504, the server device authorizes the user to access the corresponding website. As discussed herein, once the user's authenticated browser session is validated, the server device may authorize the user to access the website hosted by the browser and/or the app using the user's credential.

At operation 506, the server device transmits an authorization code to the corresponding website. In implementations, the request may include the USN. In implementations, the server device may create a log for the activity of creating the authorization code and store the log in the database.

At operation 508, an application server receives a second request to exchange the authorization code at the authentication server for a token to access the corresponding website. In implementations, the request may include the USN. As discussed herein, the UE needs a token to access the content of the website and/or the app hosted by application servers. Hence, the UE transmits the authorization code to the corresponding application server (i.e., application servers 110) for an exchange of an access token at the authorization server. The authentication server may approve the exchange for the access token and send the approval to the server device.

At operation 510, the server device generates the token to access the corresponding website. In implementations, the server device includes the USN in the access token. The JSON web token is further signed and/or encrypted using a key pair including a public key and a private key and cannot be tampered with.

At operation 512, the server device may transmit the token with USN to the UE.

At operation 514, the server device generates at least one subsequent log record corresponding to the at least one subsequent request, the at least one subsequent log record including the USN. As discussed herein, the server device generates one or more logs to record the activities during the session such as, one or more subsequent requests from the UE, creation of the authorization code and the access token, exchanging of the authorization code and the access token, etc. The server device includes the USN in the access token and in each of the logs generated within the session.

At operation 516, the server device stores the at least one subsequent log record in the database.

Figure 6:
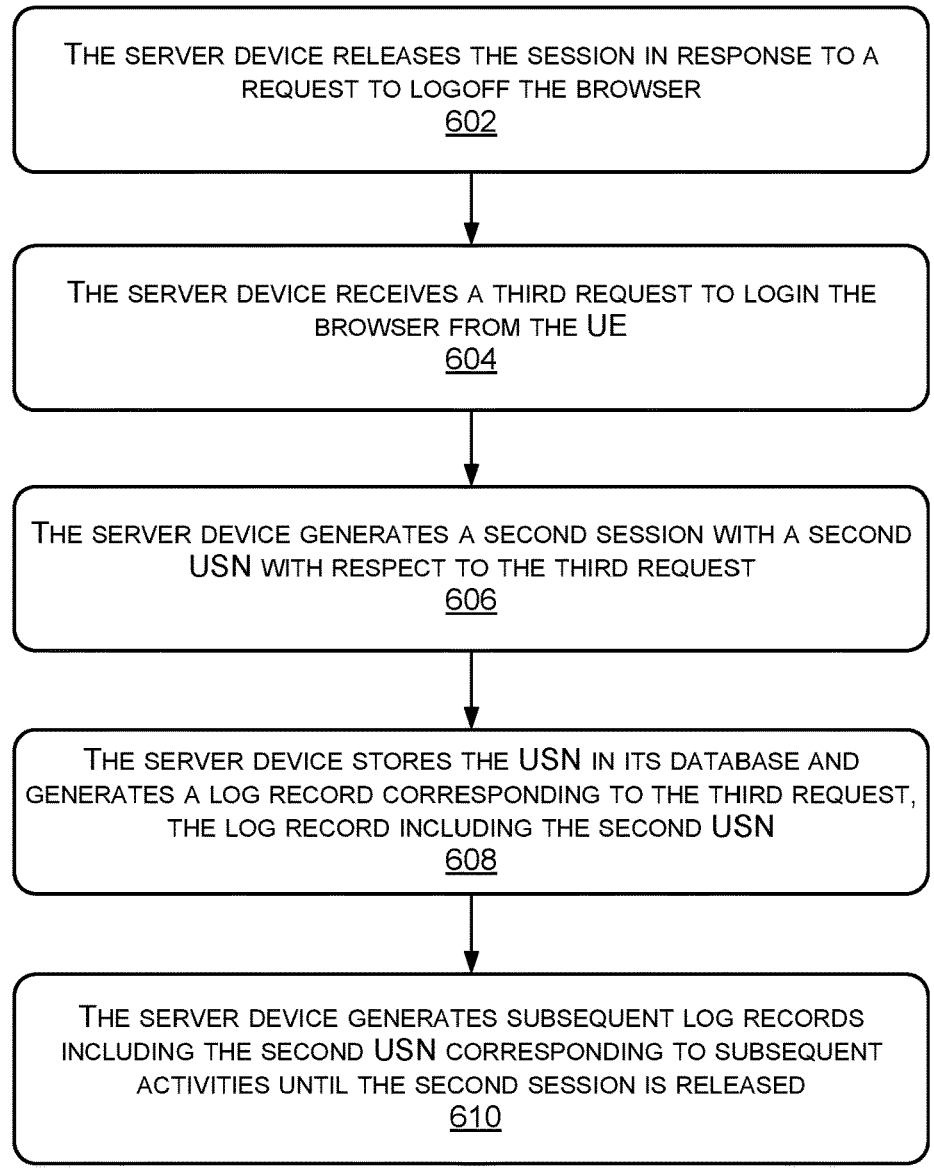
FIG. 6 illustrates yet another example process, in which unique session number (USN) sharing is implemented according to an embodiment of the present disclosure.

FIG. 6 illustrates yet another example process, in which unique session number (USN) sharing is implemented according to an embodiment of the present disclosure. The example process 600 may be performed by the authentication servers 106, as illustrated in FIGS. 1-3. The example process 600 may be a continuation of the example process 500, as illustrated in FIG. 5.

At operation 602, the server device releases the session in response to a request to log off the browse. As discussed herein, a session is uniquely created in response to a login request to a browser. The session remains active until a request to log off the browser is received and approved. Upon receiving the request to log off the browser, the session is terminated by the server device.

At operation 604, the server device receives a third request to log in the browser from the UE. In implementation, the user may login the same browser that he/she logged off at an earlier time. In another implementation, the user may log in a different browser from the same UE or from a different UE.

At operation 606, the server device generates a second session with a second USN with respect to the third request. According to the present disclosure, a new login to a browser from any type of UE triggers a new browsing session. The new browsing session is assigned with a unique session number that is different from other past or existing sessions.

At operation 608, the server device stores the USN in its database and generates a log record corresponding to the third request, the log record including the second USN.

At operation 610, the server device generates subsequent log records including the second USN corresponding to the subsequent activities until the second session is release. Once the new browsing session is created, the server device starts to write logs for all the activities occurred during the session until the session is terminated. The activities described herein are not limited to the user activities to access multiple websites and/or apps. In implementations, the activities may also include the message exchange between the UE and the server device, the creation of authorization code and access token, etc.

Figure 7:
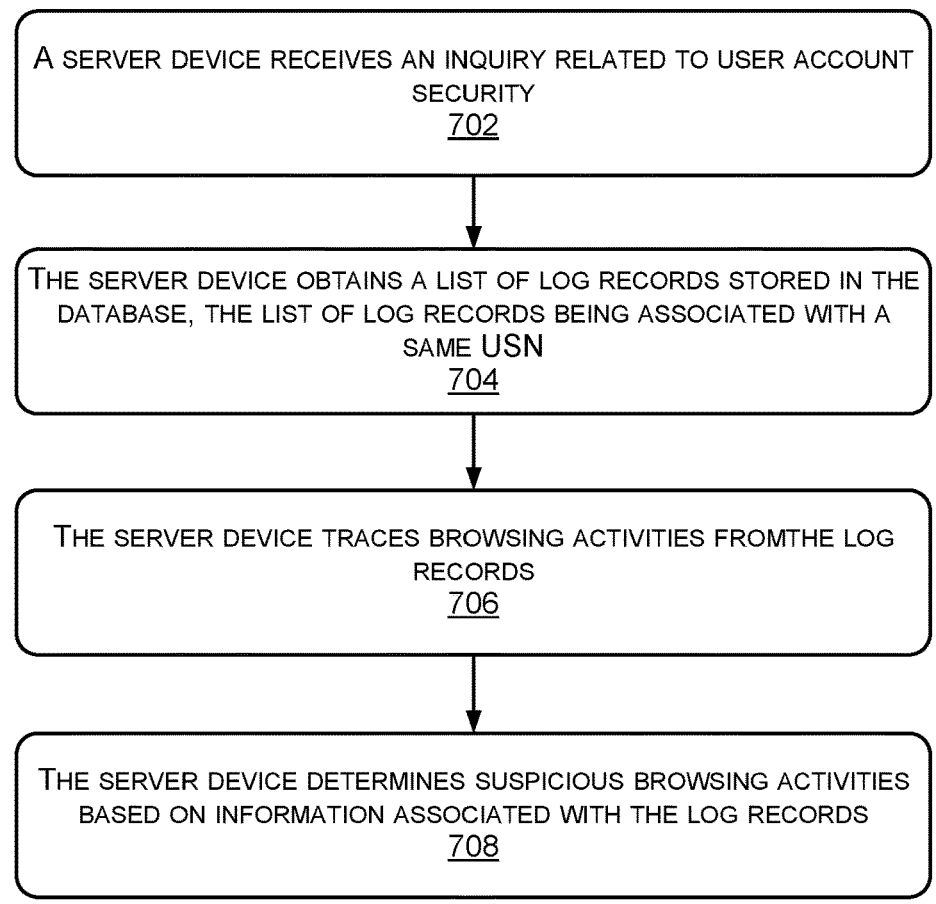
FIG. 7 illustrates yet another example process, in which unique session number (USN) sharing is implemented according to an embodiment of the present disclosure.

FIG. 7 illustrates yet another example process, in which unique session number (USN) sharing is implemented according to an embodiment of the present disclosure. The example process 700 may be performed by the authentication servers 106, as illustrated in FIGS. 1-3 and/or a third-party computing device. The example process 700 may be performed by the authentication servers 106 and application servers 110, as illustrated in FIGS. 1-3. The example process 700 may be a continuation of the example process 400, as illustrated in FIG. 4, the example process 500, as illustrated in FIG. 5, or the example process 600, as illustrated in FIG. 6.

At operation 702, a server device receives an inquiry related to user account security. In some examples, the inquiry may be related to a bad actor accessing a user account, or operational troubleshooting to understand user behavior, etc. The server device may be the server devices 106 and 110, as described above. Alternatively, or additionally, the server device may be a third-party computing device configured to monitor user account security.

At operation 704, the server device obtains a list of log records stored in the database, the list of log records being associated with a same USN. The server device may determine the time, user identities, the location, and/or the device that are potentially related to the user or bad actor behavior. The server device may obtain one or more lists of log records, each representing the activities within a unique session and being associated with a same USN.

At operation 706, the server device traces browsing activities from the log records. In implementations, the server device sorts the log records according to the time stamps and exams the user activities on the websites, webpages and/or apps the user has visited and/or used.

At operation 708, the server device determines suspicious browsing activities base on information associated with the log records. By searching the browsing activities using the USN, the server device can efficiently locate the user's browsing activities and/or suspicious logins. In implementations, the suspicious browsing activities may be determined by an information security engineer (CIRT) team or an identity and access management (IAM) team.

Figure 8:
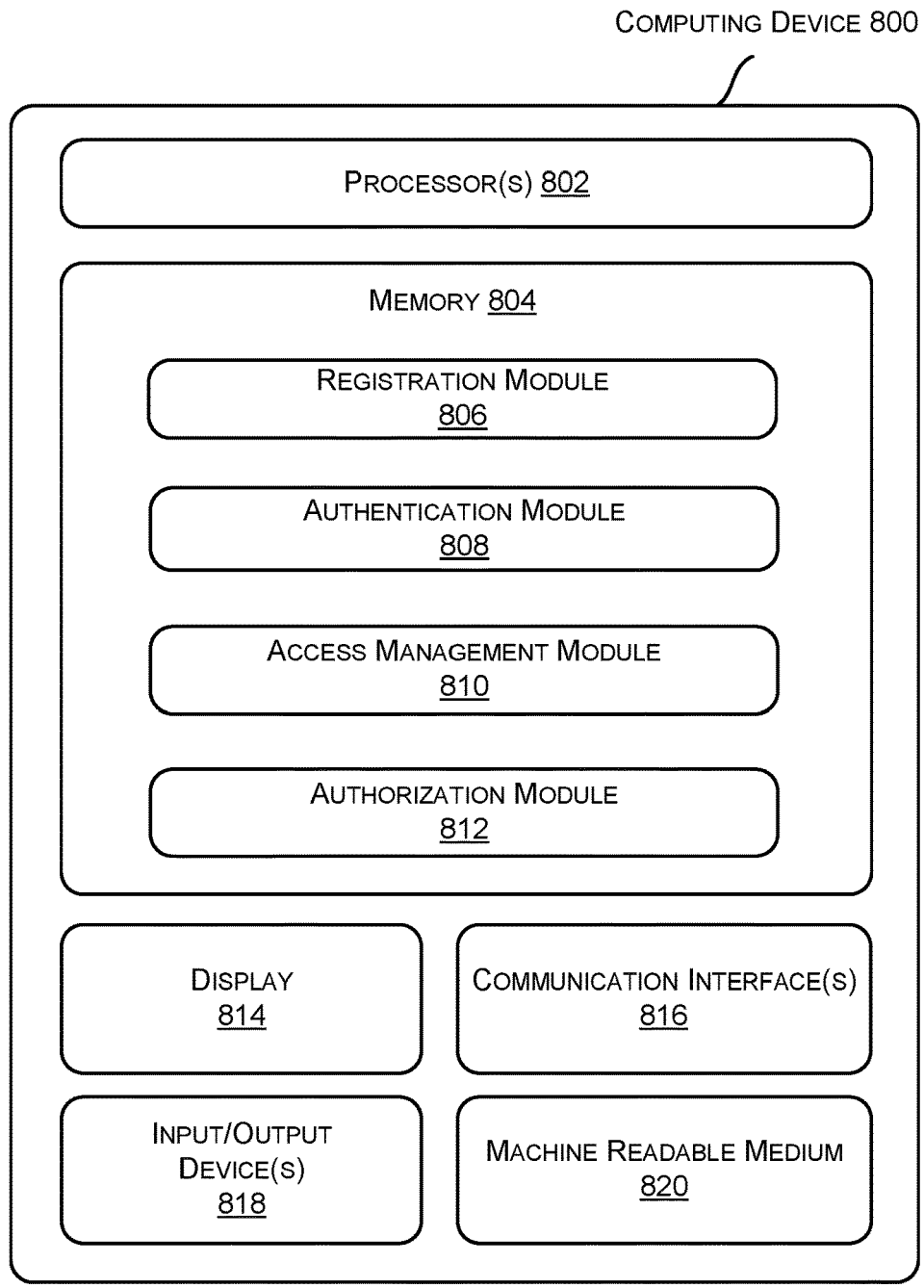
FIG. 8 illustrates an example computing device, in which unique session number (USN) sharing is implemented according to an embodiment of the present disclosure.

FIG. 8 illustrates an example computing device, in which unique session number (USN) sharing is implemented according to an embodiment of the present disclosure.

As shown, a computing device 800 may comprise processor(s) 802, a memory 804 storing a registration module 806, an authentication module 808, an access management module 810, and an authorization module 812, a display 814, communication interface(s) 816, input/output device(s) 818, and/or a machine readable medium 820.

In various examples, processor(s) 802 can be a central processing unit (CPU), a graphics processing unit (GPU), or both CPU and GPU, or any other type of processing unit. Each of the one or more processor(s) 802 may have numerous arithmetic logic units (ALUs) that perform arithmetic and logical operations, as well as one or more control units (CUs) that extract instructions and stored content from processor cache memory, and then executes these instructions by calling on the ALUs, as necessary, during program execution. Processor(s) 802 may also be responsible for executing all computer applications stored in memory 804, which can be associated with common types of volatile (RAM) and/or nonvolatile (ROM) memory.

In various examples, memory 804 can include system memory, which may be volatile (such as RAM), non-volatile (such as ROM, flash memory, etc.) or some combination of the two. Memory 804 can further include non-transitory computer-readable media, such as volatile and nonvolatile, removable and non-removable media implemented in any method or technology for storage of information, such as computer readable instructions, data structures, program modules, or other data. System memory, removable storage, and non-removable storage are all examples of non-transitory computer-readable media. Examples of non-transitory computer-readable media include, but are not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other non-transitory medium which can be used to store desired information and which can be accessed by the computing device 800. Any such non-transitory computer-readable media may be part of the computing device 800.

Registration module 806 may be configured to perform user registration on computing device 800 (i.e., server device 106, as illustrated in FIGS. 1-3). The registration occurs when the user first register his/her identify through a browser, a website, and/or an app. The registration information may be saved on machine readable medium 820 and/or a remote storage. Authentication module 808 may be configured to validate the user credentials when a login request is received from a user device. Authentication module 808 may retrieve the pre-stored registration information of the user and determine whether the received user credentials match the pre-stored registration information. Access management module 810 may be configured to manage all access activities associated with the user. In some examples, access management module 810 may create a session and a session number once the user credentials are validated. In other examples, access management module 810 may create logs with respect to various activities during an active session. Authorization module 812 may create authorization code upon receiving a request to access a website and/or an app. In some other examples, Authorization module 812 may create an access token for the user to access the website and/or the app. In implementations, the USN is included in the token when returning to the UE. Further, the JSON web token including the USN is signed and/or encrypted using a key pair including a public key and a private key and cannot be tampered with.

The communication interface(s) 816 can include transceivers, modems, interfaces, antennas, and/or other components that perform or assist in exchanging radio frequency (RF) communications with base stations of the telecommunication network, a Wi-Fi access point, and/or otherwise implement connections with one or more networks. For example, the communication interface(s) 816 can be compatible with multiple radio access technologies, such as 5G radio access technologies and 4G/LTE radio access technologies. Accordingly, the communication interfaces 816 can allow the computing device 800 to connect to the 5G system described herein.

Display 814 can be a liquid crystal display or any other type of display commonly used in computing device 800. For example, display 814 may be a touch-sensitive display screen, and can then also act as an input device or keypad, such as for providing a soft-key keyboard, navigation buttons, or any other type of input. Input/output device(s) 818 can include any sort of output devices known in the art, such as display 814, speakers, a vibrating mechanism, and/or a tactile feedback mechanism. Input/output device(s) 818 can also include ports for one or more peripheral devices, such as headphones, peripheral speakers, and/or a peripheral display. Input/output device(s) 818 can include any sort of input devices known in the art. For example, input/output device(s) 818 can include a microphone, a keyboard/keypad, and/or a touch-sensitive display, such as the touch-sensitive display screen described above. A keyboard/keypad can be a push button numeric dialing pad, a multi-key keyboard, or one or more other types of keys or buttons, and can also include a joystick-like controller, designated navigation buttons, or any other type of input mechanism.

The machine readable medium 820 can store one or more sets of instructions, such as software or firmware, that embodies any one or more of the methodologies or functions described herein. The instructions can also reside, completely or at least partially, within the memory 804, processor(s) 802, and/or communication interface(s) 816 during execution thereof by computing device 800. The memory 804 and the processor(s) 802 also can constitute machine readable media 820.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

CONCLUSION

Although the subject matter has been described in language specific to structural features and/or methodological acts, it is to be understood that the subject matter is not necessarily limited to the specific features or acts described above. Rather, the specific features and acts described above are disclosed as example embodiments.

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A method implemented by a computing device, comprising:
    generating a session with a unique session number (USN) with respect to a request from a user equipment (UE) to log in a browser;
    storing the USN in a first database;
    receiving, from the UE, at least one subsequent request to access at least one website through the browser;
    authorizing the user to access the corresponding website by transmitting an authorization code to the UE;
    receiving, from the UE, a second request to exchange the authorization code for a token to access the corresponding website;
    generating the token including the USN; and
    transmitting the token to the corresponding website.

2. The method of claim 1, further comprising:
    generating a log record corresponding to the request, the log record including the USN; and
    storing the log record in at least one of a second database or a file.

3. The method of claim 2, wherein the log record includes at least one of:
    a time stamp associated with the request,
    one or more user identifiers,
    an IP address associated with the request,
    information associated with the browser, or
    device information associated with the UE.

4. The method of claim 2, further comprising:
    generating at least one subsequent log record corresponding to the at least one subsequent request, the at least one subsequent log record including the USN; and
    storing the at least one subsequent log record in at least one of the second database or the file.

5. The method of claim 1, wherein the token is a JSON web token, and the JSON web token including the USN is created and signed or encrypted using a key pair including a public key and a private key.

6. The method of claim 4, wherein the at least one subsequent log record further includes at least one of:
    at least one time stamp associated with the at least one subsequent request,
    one or more user identifiers, at least one IP address associated with the at least one subsequent request,
information associated with the at least one web site, or device information associated with the UE.

7. The method of claim 4, further comprising:
receiving an inquiry related to user account security or user behavior for troubleshooting;
obtaining a list of log records stored in the second database or the file, the list of log records being associated with a same USN;
sorting browsing activities base on respective time stamps of the log records; and
determining browsing activities based on information associated with the log records.

8. The method of claim 4, further comprising:
releasing the session in response to a request to log off the browser;
receiving, from the UE, a third request to access the website and log in the browser; and
generates a second session with a second USN with respect to the third request;
wherein the second USN is included in log records associated with the third request and subsequent activities until the second session is released.

9. A system comprising:
a processor, and
a memory storing instructions executed by the processor to perform operations including:
generating a session with a unique session number (USN) with respect to a request from a user equipment (UE) to log in a browser;
storing the USN in a first database;
receiving, from the UE, at least one subsequent request to login at least one website through the browser;
authorizing the user to access the corresponding website by transmitting an authorization code to the UE;
receiving, from the UE, a second request to exchange the authorization code for a token to access the corresponding website;
generating the token including the USN; and
transmitting the token to the corresponding website.

10. The system of claim 9, wherein the operations further comprise:
generating a log record corresponding to the request, the log record including the USN; and
storing the log record in at least one of a second database or a file.

11. The system of claim 10, wherein the log record includes at least one of:
a time stamp associated with the request,
one or more user identifiers,
an IP address associated with the request,
information associated with the browser, or
device information associated with the UE.

12. The system of claim 10, wherein the operations further comprise:
generating at least one subsequent log record corresponding to the at least one subsequent request, the at least one subsequent log record including the USN; and
storing the at least one subsequent log record in at least one of the second database or the file.

13. The system of claim 10, wherein the token is a JSON web token and the JSON web token including the USN is created and signed or encrypted using a key pair including a public key and a private key.

14. The system of claim 12, wherein the at least one subsequent log record further includes at least one of:
at least one time stamp associated with the at least one subsequent request,
one or more user identifiers,
at least one IP address associated with the at least one subsequent request,
information associated with the at least one web site, or device information associated with the UE.

15. The system of claim 12, wherein the operations further comprise:
receiving an inquiry related to user account security or user behavior for troubleshooting;
obtaining a list of log records stored in the second database or the file, the list of log records being associated with a same USN;
sorting browsing activities base on respective time stamps of the log records; and
determining browsing activities based on information associated with the log records.

16. The system of claim 9, wherein the operations further comprise:
releasing the session in response to a request to log off the browser;
receiving, from the UE, a third request to log in the browser; and
generating a second session with a second USN with respect to the third request;
storing the second USN in the first database;
wherein the second USN is included in log records associated with the third request and subsequent activities until the second session is released.

17. One or more non-transitory computer-readable storage media storing computer-readable instructions, that when executed by one or more processors, cause the one or more processors to perform operations comprising:
generating a session with a unique session number (USN) with respect to a request from a user equipment (UE) to log in a browser;
storing the USN in a first database;
receiving, from the UE, at least one subsequent request to login at least one website through the browser;
authorizing the user to access the corresponding website by transmitting an authorization code to the UE;
receiving, from the UE, a second request to exchange the authorization code for a token to access the corresponding website;
generating the token including the USN; and
transmitting the token to the corresponding website.

18. The one or more non-transitory computer-readable storage media of claim 17, wherein the operations further comprise:
generating a log record corresponding to the request, the log record including the USN; and
storing the log record in at least one of a second database or a file.

19. The one or more non-transitory computer-readable storage media of claim 18, wherein the log record includes at least one of:
a time stamp associated with the request,
one or more user identifiers,
an IP address associated with the request,
information associated with the browser, or
device information associated with the UE.

20. The one or more non-transitory computer-readable storage media of claim 19, wherein the operations further comprise:

generating at least one subsequent log record corresponding to the at least one subsequent request, the at least one subsequent log record including the USN; and storing the at least one subsequent log record in at least one the second database or the file.

\* \* \* \* \*